(12) United States Patent
Creary et al.

(10) Patent No.: US 12,132,427 B2
(45) Date of Patent: Oct. 29, 2024

(54) MANUFACTURING-SENSITIVE CONTROL OF HIGH ROTOR POLE SWITCHED RELUCTANCE MOTORS

(71) Applicant: Turntide Technologies Inc., Sunnyvale, CA (US)

(72) Inventors: Trevor Creary, San Jose, CA (US); Mahesh Krishnamurthy, Wheaton, IL (US); Tim Knodel, Cupertino, CA (US)

(73) Assignee: Turntide Technologies, Inc., Sunnyvale, CA (US)

( * ) Notice: Subject to any disclaimer, the term of this patent is extended or adjusted under 35 U.S.C. 154(b) by 76 days.

(21) Appl. No.: 18/116,508

(22) Filed: Mar. 2, 2023

(65) Prior Publication Data

US 2023/0208336 A1    Jun. 29, 2023

Related U.S. Application Data

(63) Continuation of application No. 17/516,044, filed on Nov. 1, 2021, now Pat. No. 11,601,081, which is a continuation of application No. 16/767,190, filed as application No. PCT/US2018/025609 on Mar. 31, 2018, now Pat. No. 11,165,382.

(51) Int. Cl.
*H02P 25/089*     (2016.01)
*H02P 6/18*       (2016.01)

(52) U.S. Cl.
CPC ............ *H02P 25/089* (2016.02); *H02P 6/186* (2013.01); *H02P 2203/01* (2013.01); *H02P 2203/03* (2013.01); *H02P 2203/09* (2013.01)

(58) Field of Classification Search
CPC .... H02P 25/089; H02P 6/186; H02P 2203/01; H02P 2203/03; H02P 2203/09; H02P 1/163; H02P 25/086; H02P 6/185; H02P 25/092
USPC .................................................. 318/701, 700
See application file for complete search history.

(56) References Cited

U.S. PATENT DOCUMENTS 6,979,974 B2 * 12/2005 Slater .................... H02P 25/089
                                                           318/701

* cited by examiner

*Primary Examiner* — David Luo
(74) *Attorney, Agent, or Firm* — Temmerman Law; Mathew J. Temmerman (57) ABSTRACT

A method for controlling switched reluctance machine (SRM) utilizing a SRM control system. The method allows for adaptive pulse positioning over a wide range of speeds and loads. An initial rotor position is provided for the SRM utilizing an initialization mechanism. A pinned point on a phase current waveform is defined during an initial current rise phase of the current waveform. A slope of the current rise is determined as the current waveform reaches the pinned point. The slope is then fed to the commutation module of the SRM control system. An error signal from calculated inductance or current slope is used as an input to a control loop in the SRM control system. The time determining module determines an optimum time signal to fire a next pulse. The optimum time signal is fed to the SRM for turning the plurality of SRM switches to on and off states.

18 Claims, 6 Drawing Sheets

MANUFACTURING-SENSITIVE CONTROL OF HIGH ROTOR POLE SWITCHED RELUCTANCE MOTORS

RELATED APPLICATIONS

This application is a continuation application of and claims priority from U.S. patent application Ser. No. 17/516,044 filed Nov. 1, 2021 and granted as U.S. Pat. No. 11,601,081 on Mar. 7, 2023, and which was a continuation of U.S. patent application Ser. No. 16/767,190, filed May 27, 2020 and granted as U.S. Pat. No. 11,165,382 on Nov. 2, 2021, and which is a 35 U.S.C. 371 national phase application claiming priority to the International Application PCT/US2018/025609, filed Mar. 31, 2018. The disclosures of these applications are incorporated herein as if set out in full.

BACKGROUND OF THE DISCLOSURE

Technical Field of the Disclosure

The present disclosure relates generally to methods for controlling switched reluctance machines (SRMs), and more particularly to a method and system for controlling SRM to enable adaptive pulse positioning over a wide range of speeds and loads.

Description of the Related Art

A switched reluctance machine (SRM) is a simple type of electric motor that operates by reluctance torque. SRM includes salient rotor and stator poles. There are concentrated windings on the stator but no windings or permanent magnets on the rotor. These features enable the SRM to achieve very high-speed relative to conventional non-SRM motors. Since there are no windings in the rotor, power is only delivered to the windings in the stator rather than the rotor, and due to this simple mechanical construction SRMs offer lower maintenance costs relative to conventional electric motors. When current is passed through the stator windings, torque is generated by the tendency of the rotor poles to align with the excited stator pole. Continuous torque can be generated by synchronizing each phase's excitation with the rotor position. Accurate rotor position information is essential for controlling the motor torque.

Several techniques have been proposed for position estimation using inductance of the active or inactive phase. In most methods, a controlled signal is utilized and may be applied to the phase winding to estimate inductance and thus determine rotor position without the use of a position encoder. Certain other methods describe auto-calibration of a motor. One such method describes a sensor-less rotor position measurement system having a digital processor which receives signals from current and flux sensors of the current and flux associated with a phase winding of the machine. The measurement of the current and flux is enabled at a predicted reference rotor position. Current and flux are sampled only once per energization cycle. This method is based on position estimation methodology, which fails to provide absolute rotor position information.

Another method describes a circuit for controlling a switched reluctance motor through indirect sensing of rotor position within the switched reluctance motor. This method measures time for the current to rise between two predetermined levels. The measured current rise time can be compared to a desired current rise time to determine whether conduction intervals in the motor phases are in-phase with the position of the rotor or are lagging or leading the position of the rotor. However, this method utilizes complex algorithms for calculating the current rise time.

Yet another method for controlling a switched reluctance electric machine includes a switched reluctance electric machine having a sensor generating and transmitting a sensor signal indicative of an operating characteristic, a controller operatively coupled to the switched reluctance motor and the sensor and the controller executing a method. Here, the sensor-less control of SRM is done by injecting a pulse of voltage and measuring resultant current in the phase. However, this method injects additional voltage pulses for controlling the switched reluctance electric machine.

There is thus a need for a method for controlling a switched reluctance machine to achieve adaptive pulse positioning. Such a method would reduce manufacturing imperfections and aging effects in the machine. Further, such a method would adjust control parameters for each individual machine instead of the entire batch of manufactured machines. Moreover, such a method would provide accurate rotor position information. Such a method would utilize simple algorithms for calculating the current rise time. Further, such a method would not inject additional voltage pulses for controlling the switched reluctance electric machine. These and other objectives are accomplished by the present embodiment.

SUMMARY OF THE INVENTION

To minimize the limitations found in the prior art, and to minimize other limitations that will be apparent upon the reading of the specification, the preferred embodiment of the present invention provides a switched reluctance machine (SRM) control system that controls an SRM and enables adaptive pulse positioning over a wide range of speeds and loads. The SRM control system includes an initialization module to provide an initial rotor position for the SRM utilizing an initialization mechanism. A point defining module in the SRM control system defines a pinned point on a phase current waveform during an initial current rise phase of the current waveform. The defined pinned point is static with respect to an underlying inductance value of the SRM.

Preferably, there are two options to determine a new pinned point in order to handle a change in operating conditions and load torque profile. The first option depends on the knowledge of inductance value for this current for the new operating condition or can be calculated. And the second option is that, if simplifications in the control methodology allow, only the slope of the current profile (desired current rise) over a fixed time period based on this inductance is needed. The slope of the current (rise) is measured as the waveform reaches the pinned current level.

A slope determining module in the SRM control system determines the slope of the current rise as the current waveform reaches the pinned point. A commutation module in the system is designed to receive the slope of the current rise from the slope determining module and a frequency input signal. The SRM control system further includes an error calculating module to calculate an error signal. The SRM control system is designed to utilize the underlying inductance or the measured current rise to calculate the error signal. In one configuration, the slope of the current rise is utilized to calculate the underlying inductance that is used to calculate the error signal from the desired inductance. In another configuration, the SRM control system is designed to utilize the measured current rise over a fixed time period to calculate the error signal from a desired current rise. The error signal from the calculated inductance or current slope is used as an input to a control loop in the SRM control system. A time determining module determines an optimum time to fire a next pulse.

The preferred method describes an overall control architecture of the SRM control system. According to this control architecture, a reference speed or torque is provided as an input to the system. The slope of the current rise is calculated as the current waveform reaches the pinned point and fed to the commutation module. The underlying inductance value is calculated utilizing the slope of the current rise. Frequency input signal is the other input provided to the commutation module that gives a digital estimate for shaft speed. A current speed is calculated utilizing the slope of the current rise and frequency input signal. The error generator between the reference speed and the current speed is processed through a regulator unit which generates a commanded current. The regulator unit may be a proportional-integral (PI) regulator. The commanded current is compared with a measured current by an inner current loop in the SRM control system. Thereafter, pulse width modulation (PWM) signals are generated to create a plurality of commutation angles for turning a plurality of switches of the SRM to on and off states utilizing the time signals $T_{on}$, $T_{off}$.

The preferred embodiment includes a method for controlling the SRM utilizing the SRM control system. The method commences by providing the SRM control system. Next, the initial rotor position is provided to the SRM utilizing the initialization mechanism. Then, the pinned point on the phase current waveform is defined during the initial current rise phase of the current waveform. Thereafter, the slope of the current rise is determined as the current waveform reaches the pinned point. The slope is then fed to the commutation module. Thereafter, the error signal from the calculated inductance or current slope is used as an input to a control loop in the SRM control system. Finally, the time determining module determines an optimum time signal to fire the next pulse. The optimum time signal is fed to SRM for turning the plurality of SRM switches to on and off states.

Optimum efficiency and greatest load capacity of the SRM is obtained when the pinned point of the current waveform is near the top of the initial rise of the current waveform and the point on the induction profile it is pinned to is near the start of the induction rise for that phase of the machine.

It is a first objective of the present invention to provide an SRM control system that enables accurate pulse positioning in a sensor-less environment.

A second objective of the present invention is to provide an SRM control system for controlling an SRM that reduces manufacturing imperfections and aging effects in the machine.

A third objective of the present invention is to provide an SRM control system adaptable to adjust control parameters for each individual machine instead of the entire batch of manufactured machines.

A further objective of the present invention is to provide an SRM control system that utilizes simple algorithms for calculating the current rise time.

A still further objective of the present invention is to provide an SRM control system that does not inject additional voltage pulses for controlling the switched reluctance electric machine.

These and other advantages and features of the present invention are described with specificity so as to make the present invention understandable to one of ordinary skill in the art.

BRIEF DESCRIPTION OF THE DRAWINGS

In order to enhance their clarity and improve the understanding of the various elements and embodiments of the invention, elements in the figures have not necessarily been drawn. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/− 5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
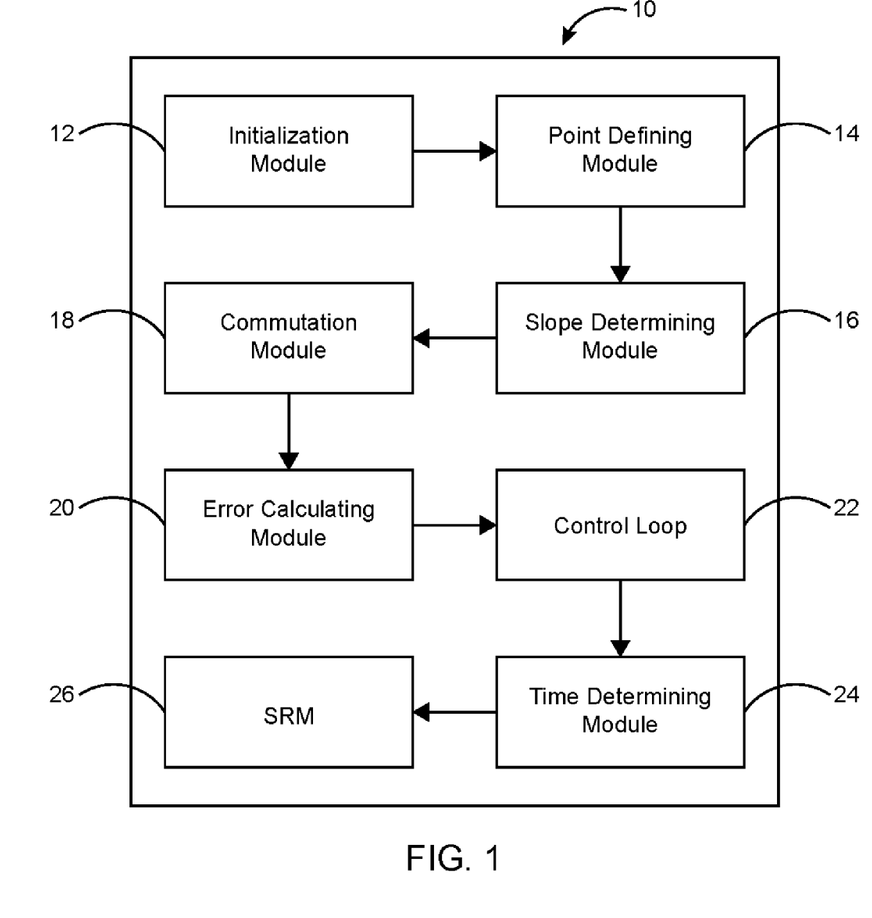
FIG. 1 illustrates a block diagram of a switched reluctance machine (SRM) control system in accordance with the preferred embodiment of the present invention.

FIG. 1 illustrates a block diagram of a switched reluctance machine (SRM) control system 10 for controlling an SRM 26. The SRM control system 10 enables adaptive pulse positioning over a wide range of speeds and loads. The SRM control system 10 includes an initialization module 12 to provide an initial rotor position for the SRM 26 utilizing an initialization mechanism. In the preferred embodiment, the initialization mechanism is adaptable to implement several approaches like hard alignment or any other mathematical approach. A point defining module 14 in the SRM control system 10 defines a pinned point on a phase current waveform during an initial current rise phase of the current waveform. The defined pinned point is static with respect to an underlying inductance value of the SRM 26 is a function of desired operating point. The PI controller for the speed loop controls the amount of time from x (pinned point) to the turn on of the next phase. If demand for speed changes then the demand for current also changes. This means that the slopes are different and requires change in the pinned point. The pinned point is defined at a specifically chosen magnitude of current between 50% and 100% of the steady state current on the initial current rise, particularly when there is a sudden change in the operating condition (load torque). This can also be useful in improving accuracy as we enter single pulse mode and the current waveform begins to plateau as the waveform gets closer to the aligned position. The goal is to have the pinned point low enough or far enough from the curved profile of current.

Preferably, there are two options to determine a new pinned point in order to handle a change in operating conditions and load torque profile. The first option depends on the knowledge of inductance value for this current for the new operating condition or can be calculated. And the second option is that, if simplifications in the control methodology allow, only the slope of the current profile (desired current rise) over a fixed time period based on this inductance is needed.

Figure 2:
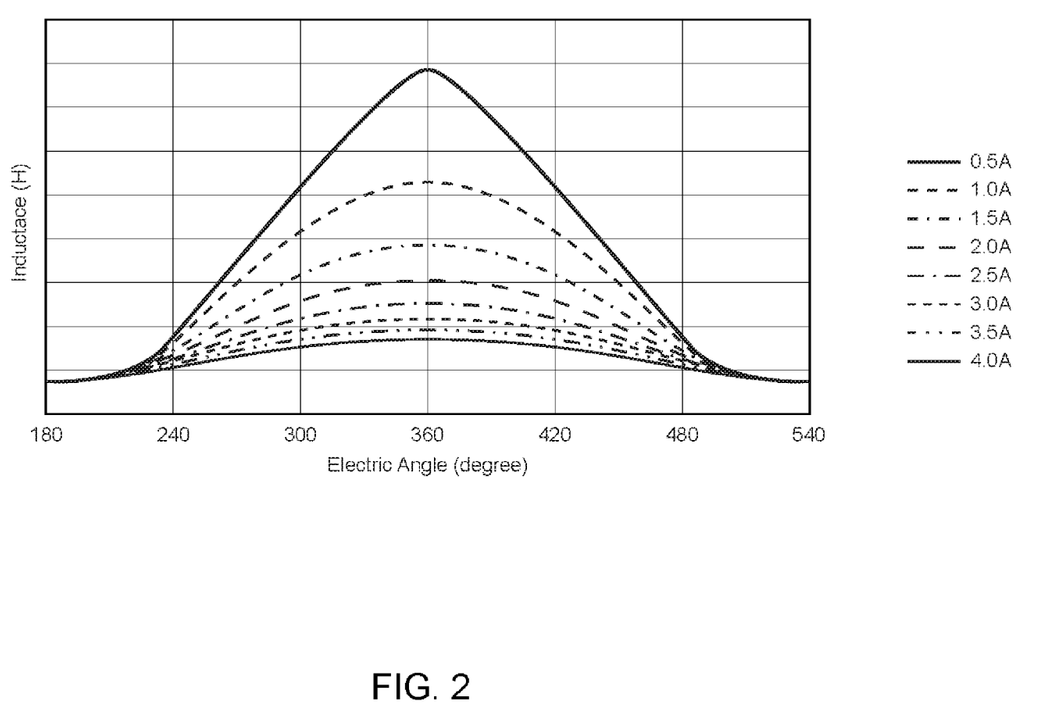
FIG. 2 illustrates a graphical representation showing change in the inductance profile with respect to change in the electric angle in accordance with the preferred embodiment of the present invention.

A slope determining module 16 determines a slope 42 (see FIG. 3) of the current rise as the current waveform reaches the pinned point. The slope of the current (rise) is measured as the waveform reaches the pinned current level. As shown in the graphical representation illustrated in FIG. 2, if we change the current value, the inductance profile also changes with it. This means the angle corresponding to the pinned position must be changed until the same slope is arrived as was arrived at the previous case.

A commutation module 18 is designed to receive the slope 42 of the current rise from the slope determining module 16. The SRM control system 10 further comprises an error calculating module 20 to calculate an error signal. The SRM control system 10 is designed to utilize the underlying inductance or the measured current rise to calculate the error signal. In one configuration, the slope 42 of the current rise is utilized to calculate the underlying inductance which is used to calculate the error signal from the desired inductance. In another configuration, the SRM control system 10 is designed to utilize the measured current rise over a fixed time period to calculate the error signal from a desired current rise. The error signal from the calculated inductance or current slope is used as an input to a control loop 22 in the SRM control system 10. Finally, a time determining module 24 determines an optimum time $T_{on}$, $T_{off}$ 40 (see FIG. 3) to fire a next pulse. The optimum time $T_{on}$, $T_{off}$ 40 turns a plurality of switches of the SRM 26 to on and off states. In one configuration of the preferred embodiment, position is determined to fire a next pulse.

Figure 3:
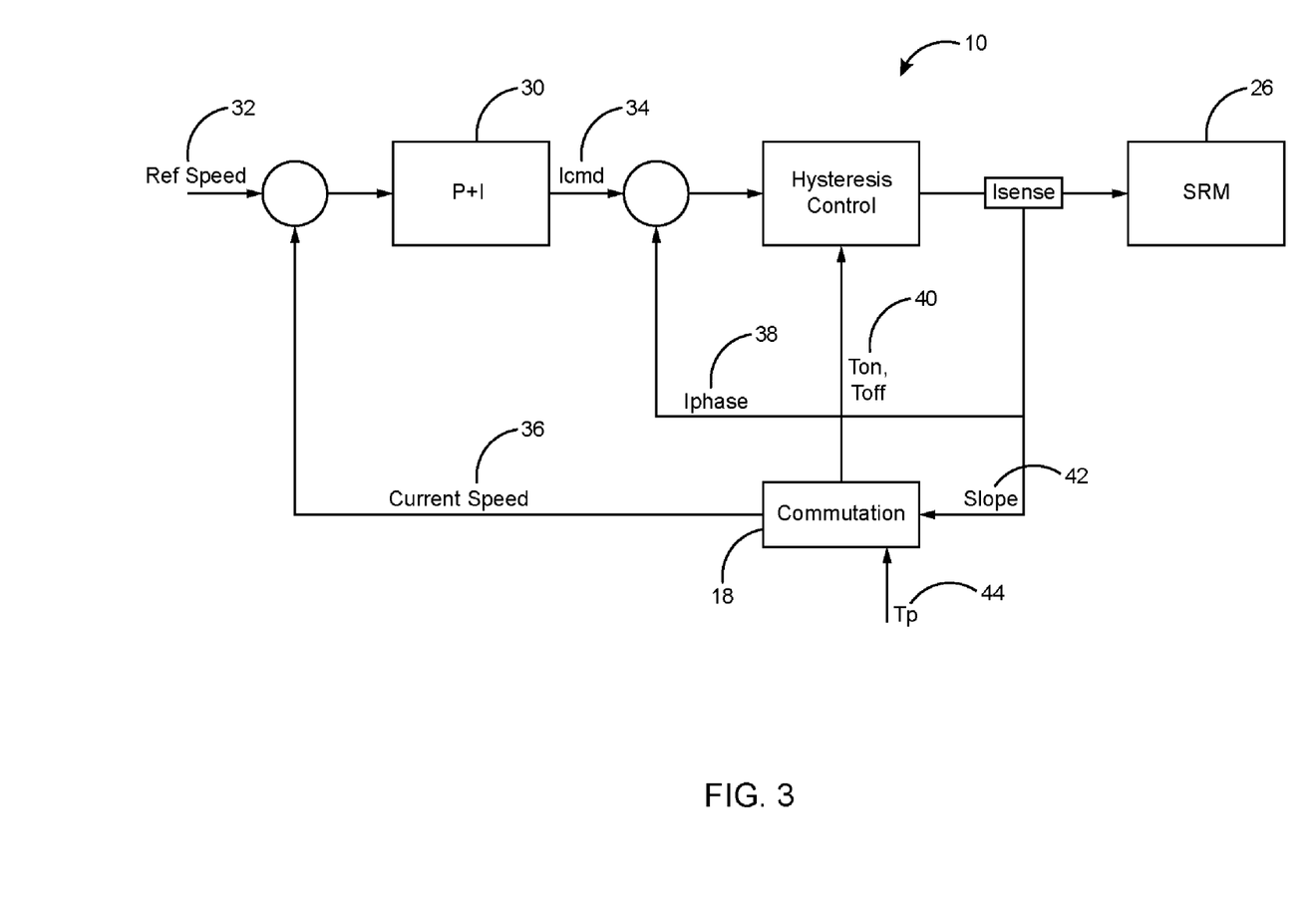
FIG. 3 illustrates an overall control architecture of the SRM control system with speed and current loops in accordance with the preferred embodiment of the present invention.

FIG. 3 shows an overall control architecture of the SRM control system 10 with speed and current loops. Here, a reference speed (Ref Speed) 32 or torque is provided as an input to the system 10. Preferably, the proposed method for controlling SRM 26 utilizes a current feedback. The slope 42 of the current rise is calculated as the current waveform reaches the pinned point and is fed to the commutation module 18. The underlying inductance value is calculated utilizing the slope 42 of the current rise. Frequency input signal $T_p$ 44 is the other input provided to the commutation module 18 that gives a digital estimate for shaft speed. A current speed 36 is calculated utilizing the slope 42 of the current rise and frequency input signal $T_p$ 44. The error generator between the reference speed 32 and the current speed 36 is processed through a regulator unit 30 that generates a commanded current (Iced) 34. The regulator unit 30 may be a proportional-integral (PI) regulator. The commanded current 34 is compared with a measured current ($I_{phase}$) 38 by an inner current loop in the SRM control system 10 to generate pulse width modulation (PWM) signals. The PWM signals create a plurality of commutation angles for turning the plurality of switches of the SRM 26 to on and off states utilizing the time signals $T_{on}$, $T_{off}$ 40.

Figure 4:
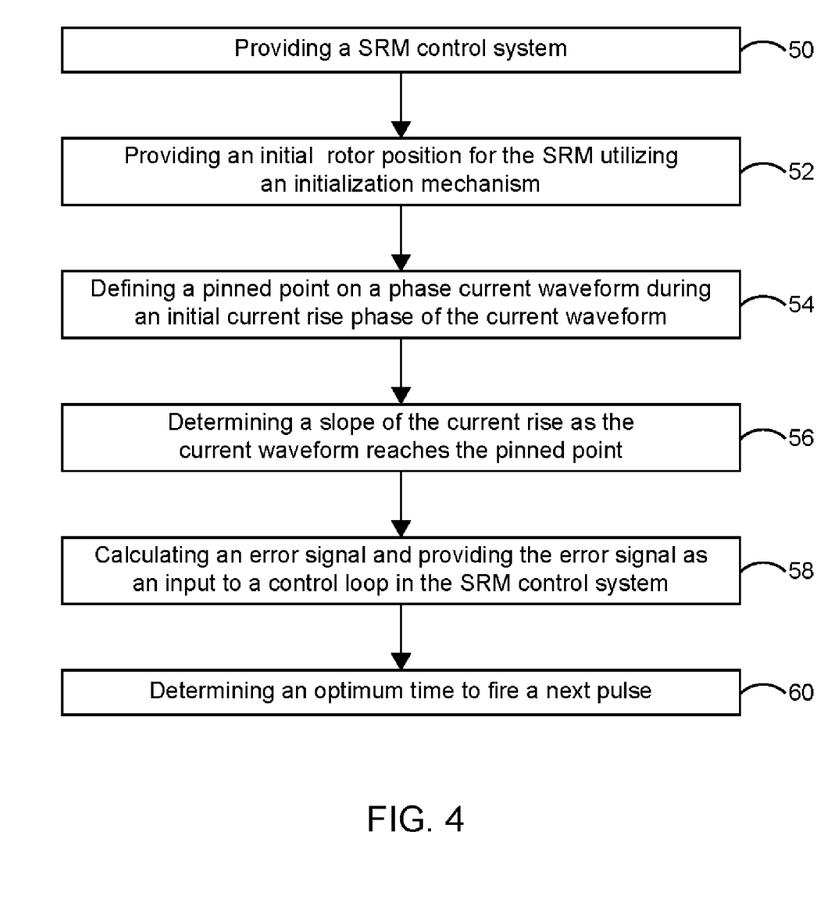
FIG. 4 illustrates a flowchart of a method for controlling the SRM utilizing the SRM control system in accordance with the preferred embodiment of the present invention.

FIG. 4 shows a flowchart of a method for controlling the SRM 26 utilizing the SRM control system 10. As shown in block 50, the SRM control system having the commutation module is provided. Next, the initial rotor position is provided to the SRM utilizing the initialization mechanism as shown in block 52. Then, the pinned point on the phase current waveform is defined during the initial current rise phase of the current waveform as indicated at block 54. Thereafter, the slope of the current rise is determined as the current waveform reaches the pinned point as shown in block 56. The slope is then fed to the commutation module. Thereafter, the error signal from the calculated inductance or current slope is used as an input to a control loop in the SRM control system as shown in block 58. Finally, the time determining module determines an optimum time signal to fire the next pulse as indicated at block 60. The optimum time signal is fed to SRM for turning the plurality of SRM switches to on and off states.

Figure 5:
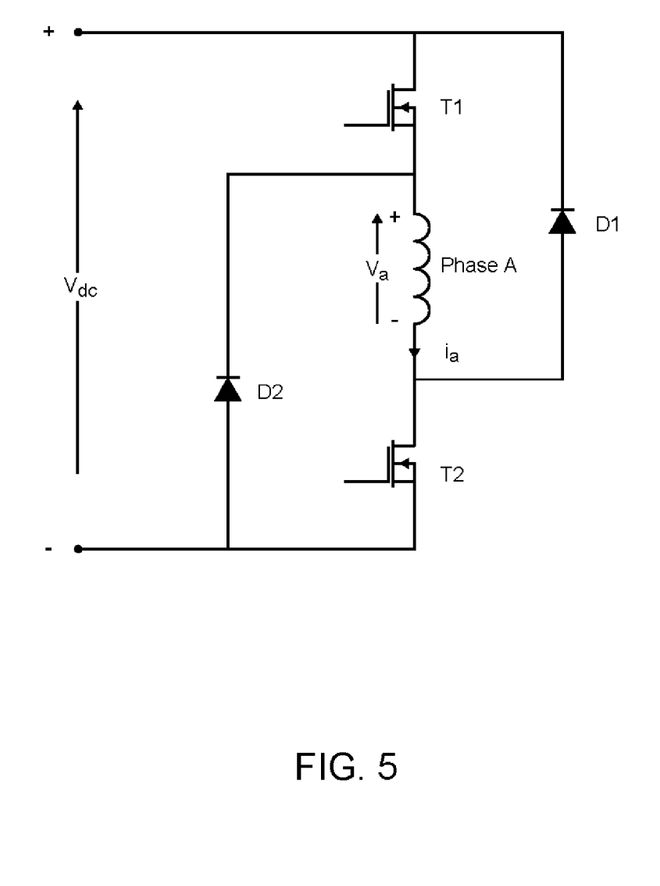
FIG. 5 illustrates an asymmetric bridge configuration for controlling phase current of the SRM in accordance with the preferred embodiment of the present invention.

FIG. 5 shows an asymmetric bridge configuration typically used for controlling the SRM 26. This configuration has each phase connected between two switches T1, T2 which allows independent control and ensures that the inverter does not have a shoot-through failure. The turn-on and turn-off signals 40 in FIG. 3 are used to control switches T1 and T2.

Figure 6:
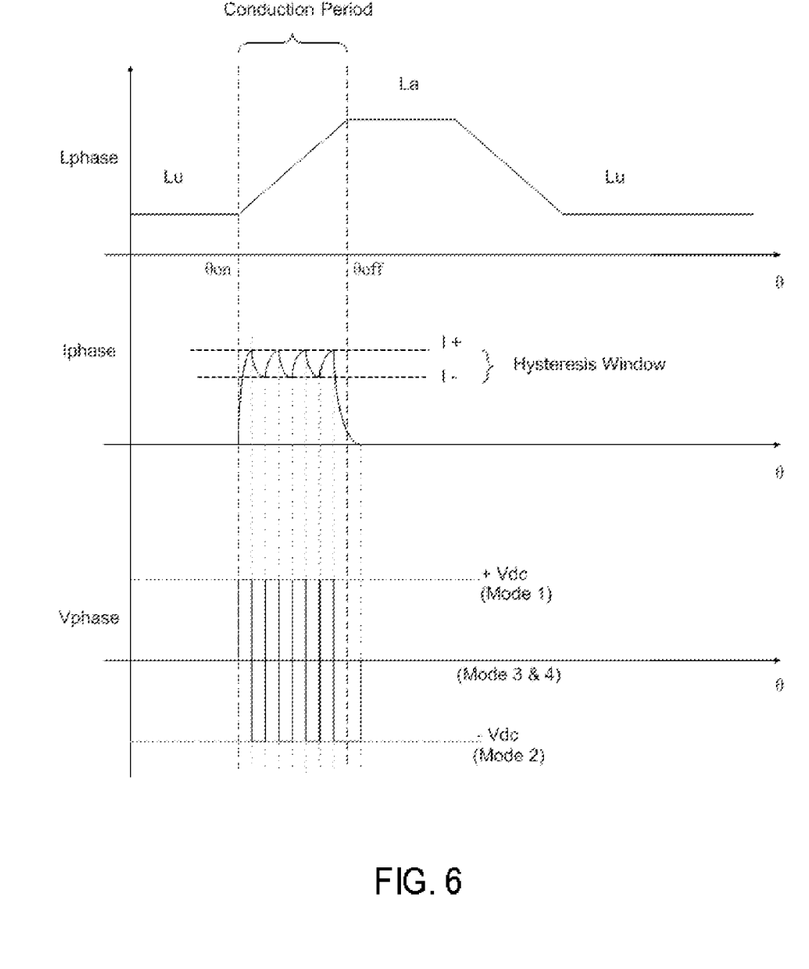
FIG. 6 illustrates a pinned point at a current waveform of a three-phase SRM in accordance with the preferred embodiment of the present invention.

FIG. 6 shows three current waveforms for a three-phase machine. In this example, "x" is the pinned point of the current waveform in phase A of the machine. Here, the pinned point is roughly at 80% of steady state current for the operating condition. Optimum efficiency and greatest load capacity of the SRM is obtained when the pinned point of the current waveform is near the top of the initial rise of the current waveform and the point on the induction profile it is pinned to is near the start of the induction rise for that phase of the machine.

In the current embodiment, the feedback from one commutation pulse is used for the positioning of the next pulse. Instead, the feedback from this pulse could be used to adjust the position of the next pulse in the same phase, or the next time that specific stator rotor pole combination is reached, or anything in between.

Using each pulse to modify only pulses of the same phase has the benefit of allowing phases to be adjusted independently due to non-uniform inductance on each phase; however, the position feedback is slower by a multiple of the number of phases in the machine. This could be overcome by using the error of the current pulse to input to two control loops. Among the two control loops, one adjusts the current phase and the other adjusts all of the phases allowing for both minor adjustments between phases while still achieving rapid feedback to the main control methodology.

Using each pulse to modify only the same stator rotor poll combination has the benefit that it allows adjustments to non-uniform pole positions, air-gap and inductance; however, this position feedback is slower by a multiple of the number of phases times the number of rotor poles. A similar methodology to the previous could be used to introduce the extra degree of freedom while still maintaining rapid feedback.

In the current embodiment, an event base control loop was utilized. Any form of control loop operating from the error between the desired inductance (or desired current rise) and the measured inductance (or measured current rise) meets the intent of the preferred embodiment.

In the current embodiment, the current was pinned on the initial rising edge of the pulse; however, any point along an arbitrary waveform can be used as the pinned point.

In the current embodiment, the current rise was used at the specified point on the current rise; however, at the desired waveform position, the phase could be switched off or freewheeled and the current drop/decay at that point could be used in the same manner to control position.

In the current embodiment, the output of the control loop is the desired time between pulses and when the time from the last pulse is reached, the next pulse is fired. The output of the control loop could also be tuned such that it is the desired position on a software encoder which is being updated continuously based on the speed estimations. This methodology induces further error because the software encoder is prone to drift due to error in the speed measurements but would achieve the same effect. Similarly, a hardware encoder could be used and this methodology could position the pulses relative to the hardware encoder.

This methodology could be extended further to allow for adjustments in the desired inductance (or desired current rise) based on speed, load, or desired optimization. These adjustments could be applied from a lookup table based on current operating point or calculated real time based on an adjustment formula.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

We claim:

1. An SRM control system for controlling an SRM, the system comprising:
    an initialization module to provide an initial rotor position for the SRM utilizing an initialization mechanism;
    a point defining module to define a pinned point on a phase current waveform of a pulse during an initial current rise phase of the current waveform, the current waveform starting to rise in correspondence of an inductance rise (Con) of a phase of the SRM, wherein the pinned point is defined at a point corresponding to a magnitude between 50% and 100% of the steady state current on the initial current rise;
    a slope determining module to determine a slope of the current rise as the current waveform reaches the pinned point;
    a commutation module to receive the slope of the current rise from the slope determining module and a frequency input signal;
    whereby the SRM control system enables adaptive pulse positioning over a wide range of speeds and loads.

2. The SRM control system of claim 1 further comprising a controller that determines an amount of time from the pinned point to turning on a next phase.

3. The SRM control system of claim 1 wherein the system utilizes the underlying inductance to calculate an error signal from a desired inductance value.

4. The SRM control system of claim 3, wherein the system utilizes the measured current rise over a fixed time period to calculate the error signal from a desired current rise.

5. The SRM control system of claim 1 wherein the optimum time determined from the time determining module is utilized to turn a plurality of switches of the SRM to on and off states.

6. A switched reluctance machine (SRM) control system for controlling an SRM comprises:
    an initialization module to provide an initial rotor position for the SRM utilizing an initialization mechanism;
    a point defining module to define a pinned point on a phase current waveform during an initial current rise phase of the current waveform;
    a slope determining module to determine a slope of the current rise as the current waveform reaches the pinned point;
    a commutation module to receive the slope of the current rise from the slope determining module and a frequency input signal;
    generating pulse width modulation (PWM) signals to create a plurality of commutation angles for turning a plurality of switches of the SRM to on and off states.

7. The SRM control system of claim 6 further comprising a controller that determines an amount of time from the pinned point to turning on a next phase.

8. The SRM control system of claim 6 wherein the defined pinned point is static with respect to an underlying inductance value of the SRM.

9. The SRM control system of claim 6 wherein the pinned position is defined at a point corresponding to a magnitude between 50% and 100% of the steady state current on the initial current rise.

10. The SRM control system of claim 6 wherein the optimum time determined from the time determining module is utilized to turn the plurality of switches of the SRM to on and off states.

11. The SRM control system of claim 6 is designed to utilize the underlying inductance to calculate an error signal from a desired inductance value.

12. The SRM control system of claim 11 is designed to utilize the measured current rise over a fixed time period to calculate the error signal from a desired current rise.

13. The SRM control system of claim 12 wherein the error signal is processed through a regulator unit that generates a commanded current.

14. A method for controlling a switched reluctance machine (SRM) comprising the steps of:
   a) providing an SRM control system having a commutation module;
   b) providing an initialization module to provide an initial rotor position for the SRM utilizing an initialization mechanism;
   c) defining a pinned point on a phase current waveform during an initial current rise phase of the current waveform;
   d) determining a slope of the current rise as the current waveform reaches the pinned point, the slope being fed to the commutation module;
   e) generating pulse width modulation (PWM) signals to create a plurality of commutation angles for turning a plurality of switches of the SRM to on and off states.

15. The method of claim 14 further comprising turning on a next phase based on an amount of time from the pinned point, the amount of time provided by a controller.

16. The method of claim 14 wherein the pinned point is defined at a point corresponding to a magnitude between 50% and 100% of the steady state current on the initial current rise.

17. The method of claim 14 wherein the SRM control system is designed to utilize the underlying inductance to calculate an error signal from a desired inductance value.

18. The method of claim 14 wherein the SRM control system is designed to utilize the measured current rise over a fixed time period to calculate the error signal from a desired current rise.

* * * * *